(12) United States Patent
Arrasvuori et al.

(10) Patent No.: US 9,319,821 B2
(45) Date of Patent: Apr. 19, 2016

(54) METHOD, AN APPARATUS AND A COMPUTER PROGRAM FOR MODIFICATION OF A COMPOSITE AUDIO SIGNAL

(75) Inventors: Juha Arrasvuori, Tampere (FI); Kari Järvinen, Tampere (FI); Roope Järvinen, Lempäälä (FI); Miikka Vilermo, Siuro (FI); Erika Reponen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 35 days.

(21) Appl. No.: 14/374,477

(22) PCT Filed: Mar. 29, 2012

(86) PCT No.: PCT/FI2012/050312
§ 371 (c)(1),
(2), (4) Date: Jul. 24, 2014

(87) PCT Pub. No.: WO2013/144417
PCT Pub. Date: Oct. 3, 2013

(65) Prior Publication Data
US 2014/0369506 A1    Dec. 18, 2014

(51) Int. Cl.
*H04R 29/00*    (2006.01)
*H04R 3/00*    (2006.01)
(Continued)

(52) U.S. Cl.
CPC .............. *H04S 7/302* (2013.01); *G01S 3/8083* (2013.01); *H04R 5/02* (2013.01); *H04S 7/40* (2013.01);
(Continued)

(58) Field of Classification Search
CPC .............. G01S 3/8083; H04S 2400/01; H04S 2400/11; H04S 2400/15; H04S 7/302; H04S 7/40; H04R 29/00; H04R 29/008; H04R 3/00; H04R 5/00; H04R 5/02

USPC .......................... 381/17, 1, 56, 92, 124, 306
See application file for complete search history.

(56) References Cited

U.S. PATENT DOCUMENTS 5,636,283 A * 6/1997 Hill .......................... H04S 7/302
                                                               381/1
5,995,706 A * 11/1999 Iijima ..................... G11B 27/029
                                                               348/E5.1

(Continued)

OTHER PUBLICATIONS

Lu et al., "Content Discovery From Composite Audio : An Unsupervised Approach", Thesis, 2009, 155 Pages.

(Continued)

*Primary Examiner* — Khai N Nguyen
(74) *Attorney, Agent, or Firm* — Nokia Technologies Oy

(57) ABSTRACT

The present invention provides an arrangement, e.g. a method, an apparatus and a computer program. The arrangement comprises obtaining information indicative of spatial positions of one or more sound sources within an audio image of a composite audio signal, obtaining information indicative of the types of the one or more sound sources, determining, for each of the one or more sound sources, a position in a display of the apparatus indicative of the spatial position of the sound source and causing an apparatus to display an item representing the sound source in the determined position in the display, wherein the item representing the sound source is determined on basis of the type of the sound source. The arrangement further comprises receiving an indication of a user action associated with an item indicative of a first sound source, determining an indication of a user selected modification of the audio image on basis of the user action, and modifying the composite audio signal in accordance with the user selected modification.

20 Claims, 7 Drawing Sheets

(51) Int. Cl.
  *H04R 5/00* (2006.01)
  *H04R 5/02* (2006.01)
  *H04S 7/00* (2006.01)
  *G01S 3/808* (2006.01)

(52) U.S. Cl.
  CPC ....... *G10H 2220/111* (2013.01); *H04S 2400/01* (2013.01); *H04S 2400/11* (2013.01); *H04S 2400/15* (2013.01)

(56) References Cited

U.S. PATENT DOCUMENTS

| | | | | |
|---|---|---|---|---|
| 7,774,707 | B2* | 8/2010 | Sim | G10H 1/0066 715/727 |
| 8,190,438 | B1* | 5/2012 | Nelissen | G10L 21/00 381/85 |
| 8,384,753 | B1* | 2/2013 | Bedingfield, Sr. | H04L 67/36 348/14.01 |
| 8,908,874 | B2* | 12/2014 | Johnston | G10L 19/008 381/23 |
| 9,042,565 | B2* | 5/2015 | Jot | G10L 19/008 381/63 |
| 2004/0141622 | A1 | 7/2004 | Squibbs | |
| 2009/0207131 | A1 | 8/2009 | Togami et al. | |
| 2010/0111336 | A1* | 5/2010 | Jeong | H04R 5/04 381/306 |
| 2010/0328423 | A1* | 12/2010 | Etter | H04N 7/15 348/14.16 |
| 2011/0013075 | A1* | 1/2011 | Kim | H04N 5/602 348/370 |
| 2012/0057715 | A1* | 3/2012 | Johnston | G10L 19/008 381/63 |
| 2012/0082319 | A1* | 4/2012 | Jot | G10L 19/008 381/63 |

OTHER PUBLICATIONS

Weiss et al., "Source Separation Based on Binaural Cues and Source Model Constraints", Proceedings of Interspeech, 2008, 4 Pages.

Umapathy et al., "Audio Signal Feature Extraction and Classification Using Local Discriminant Bases", IEEE Transactions on Audio, Speech, and Language Processing, vol. 15, No. 4, May 2007, pp. 1236-1246.

Zhou et al., "Enhanced Class-Dependent Classification of Audio Signals", Proceedings of the World Congress on Computer Science and Information Engineering, vol. 07, 2009, pp. 100-104.

Liao et al., "Classification of Audio Signals in All-Night Sleep Studies", 18th International Conference on Pattern Recognition, vol. 4, 2006, 4 Pages.

Martin et al., "Cepstral Modulation Ratio Regression (Cmrare) Parameters for Audio Signal Analysis and Classification", IEEE International Conference on Acoustics, Speech and Signal Processing, Apr. 19-24, 2009, pp. 321-324.

International Search Report received for corresponding Patent Cooperation Treaty Application No. PCT/FI2012/050312, dated Feb. 4, 2013, 4 pages.

Extended European Search Report received for corresponding European Patent Application No. 12872916.7, dated Nov. 6, 2015, 6 pages.

Marchand et al., "Interactive Music With Active Audio CDs", Proceedings of the 7th international conference on Exploring music contents, vol. 6684, Jun. 21, 2010, pp. 31-50.

Bredies et al., "The Multi-Touch SoundScape Renderer", Proceedings of the working conference on Advanced visual interfaces, May 28-30, 2008, pp. 466-469.

* cited by examiner

METHOD, AN APPARATUS AND A COMPUTER PROGRAM FOR MODIFICATION OF A COMPOSITE AUDIO SIGNAL

RELATED APPLICATION

This application was originally filed as PCT Application No. PCT/FI2012/050312 filed Mar. 29, 2012.

TECHNICAL FIELD

The invention relates to a method, to an apparatus and to a computer program for modification of a composite audio signal. In particular, the invention relates to a method, an apparatus and a computer program for modifying one or more sound sources of a spatial composite audio signal comprising.

BACKGROUND

Recording arrangements enabling spatial audio capture are becoming increasingly common as for example mass-market mobile devices are equipped with multiple microphones or microphone arrays. While such recording arrangements enable recording of a spatial audio image comprising multiple sound sources more precisely than before, such recording arrangements typically eventually downmix the recorded audio signal into a composite stereo or binaural audio signal, where the multiple sound sources are not separable in a straightforward manner. Hence, a challenge lies with process of the user of the mobile device modifying the spatial audio image of the recorded audio signal. Moreover, another challenge is a lack of intuitive processing tools and/or interfaces for a user modify an audio image of an audio signal of any kind.

SUMMARY

According to a first aspect of the present invention, an apparatus is provided, the apparatus comprising an audio analyzer configured to obtain information indicative of spatial positions of one or more sound sources within an audio image of a composite audio signal, and to obtain information indicative of the types of the one or more sound sources. The apparatus further comprises a user interface controller configured to, for each of the one or more sound sources, determine a position in a display of the apparatus indicative of the spatial position of the sound source and cause the apparatus to display an item representing the sound source in the determined position in the display, wherein the item representing the sound source is determined on basis of the type of the sound source, to receive an indication of a user action associated with an item representing a selected sound source, and to determine an indication of a user selected modification of the audio image on basis of the user action. The apparatus further comprises an audio processor configured to modify the composite audio signal in accordance with the user selected modification.

According to a second aspect of the present invention, an apparatus is provided, the apparatus comprising at least one processor and at least one memory including computer program code for one or more programs, the at least one memory and the computer program code configured to, with the at least one processor, cause the apparatus at least to obtain information indicative of spatial positions of one or more sound sources within an audio image of a composite audio signal, to obtain information indicative of the types of the one or more sound sources, and to determine, for each of the one or more sound sources, a position in a display of the apparatus indicative of the spatial position of the sound source and cause the apparatus to display an item representing the sound source in the determined position in the display, wherein the item representing the sound source is determined on basis of the type of the sound source. The apparatus is further configured to receive an indication of a user action associated with an item representing a selected sound source, to determine an indication of a user selected modification of the audio image on basis of the user action, and to modify the composite audio signal in accordance with the user selected modification.

According to a third aspect of the present invention, an apparatus is provided, the apparatus comprising means for means for obtaining information indicative of spatial positions of one or more sound sources within an audio image of a composite audio signal, means for obtaining information indicative of the types of the one or more sound sources, means for determining, for each of the one or more sound sources, a position in a display of the apparatus indicative of the spatial position of the sound source, and means for causing an apparatus to display, for each of the one or more sound sources, an item representing the sound source in the respective determined position in the display, wherein the item representing the sound source is determined on basis of the type of the sound source. The apparatus further comprises means for receiving an indication of a user action associated with an item indicative of a selected sound source, means for determining an indication of a user selected modification of the audio image on basis of the user action, and means for modifying the composite audio signal in accordance with the user selected modification.

According to a fourth aspect of the present invention, a method is provided, the method comprising obtaining information indicative of spatial positions of one or more sound sources within an audio image of a composite audio signal, obtaining information indicative of the types of the one or more sound sources, determining, for each of the one or more sound sources, a position in a display of the apparatus indicative of the spatial position of the sound source and causing an apparatus to display an item representing the sound source in the determined position in the display, wherein the item representing the sound source is determined on basis of the type of the sound source. The method further comprises receiving an indication of a user action associated with an item indicative of a first sound source, determining an indication of a user selected modification of the audio image on basis of the user action, and modifying the composite audio signal in accordance with the user selected modification.

According to a fifth aspect of the present invention, a computer program is provided, the computer program including one or more sequences of one or more instructions which, when executed by one or more processors, cause an apparatus at least to obtain information indicative of spatial positions of one or more sound sources within an audio image of a composite audio signal, to obtain information indicative of the types of the one or more sound sources, to determine, for each of the one or more sound sources, a position in a display of the apparatus indicative of the spatial position of the sound source and to cause the apparatus to display an item representing the sound source in the determined position in the display, wherein the item representing the sound source is determined on basis of the type of the sound source, to receive an indication of a user action associated with an item representing a selected sound source, to determine an indication of a user selected modification of the audio image on basis of the user action; and to modify the composite audio signal in accordance with the user selected modification.

The computer program may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to the fifth aspect of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

The novel features which are considered as characteristic of the invention are set forth in particular in the appended claims. The invention itself, however, both as to its construction and its method of operation, together with additional objects and advantages thereof, will be best understood from the following detailed description of specific embodiments when read in connection with the accompanying drawings.

DETAILED DESCRIPTION

An audio signal may comprise one or more channels. A single channel audio signal may be referred to as a monaural audio signal, a two-channel audio signal may be referred to as a stereophonic audio signal, whereas an audio signal comprising three or more channels may be referred to as a multi-channel audio signal. Alternatively, the term multi-channel signal may be used to refer to an audio signal comprising two or more channels. A multi-channel audio signal may be further defined with respect to the spatial relationship of the channels comprised therein, thereby defining the channel configuration of the multi-channel audio signal. As an example, the channel configuration may define for each channel of a multi-channel audio signal a respective assumed direction of arrival with respect to an assumed listening point. Known examples of audio channel configurations include stereophonic, Dolby Surround (four channels), 5.1 surround sound (six channels) and 7.1 surround sound (eight channels).

A binaural signal is a specific type of a two-channel audio signal, wherein a sound source may be represented in such a way that it has a predetermined perceivable direction of arrival. The perceived direction of arrival may also be referred to e.g. as the position of the sound source in the audio image or as the spatial position of the sound source. Perceiving the predetermined direction of arrival in a binaural audio signal typically requires listening by headphones, by using a pair of loudspeakers arranged as a stereo dipole or using another arrangement enabling prevention and/or cancellation of the crosstalk between the two ears of the listener.

Figure 1:
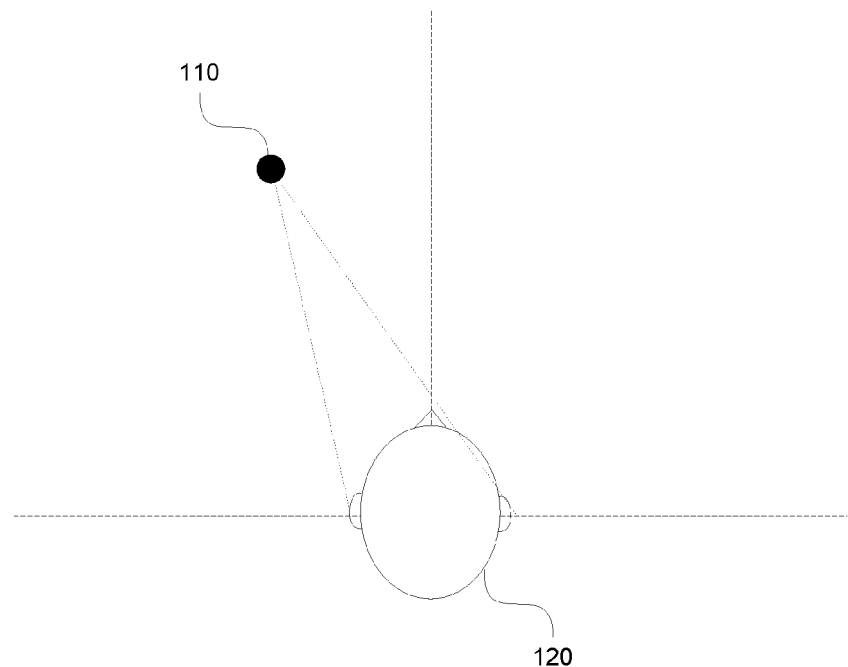
FIG. 1 schematically illustrates a concept of binaural hearing.

An example of binaural listening/hearing is schematically illustrated in FIG. 1. A listener 120, depicted directly from above, receives an audio signal originating from a sound source 110 that is in a left side in front of the listener 120. As the example indicates, the distance from the sound source 110 to the left ear of the listener 120 is shorter than the distance from the sound source 110 to the right ear of the listener 120, consequently resulting in the audio signal originating from the sound source 110 being received at the left ear of the listener 120 slightly before the corresponding audio signal is received at the right ear of the listener 120. Moreover, due to the longer distance, an audio signal originating from the sound source 110 is received at the right ear at a slightly lower signal level than at the left ear. Hence, the differences both in time of reception and in level of received audio signals occur due to the distance from the sound source 110 to the left ear being shorter than to the right ear. A further level difference between the signals received at the left and right ears may be caused by the masking effect caused by the body of the listener, by the head, the earlobes and the shoulders in particular.

In this regard, in the example of FIG. 1 the audio signal received at the right ear of the listener is partially shadowed by the head of the listener 120, thereby causing further attenuation of the signal as received in the right ear of the listener 120.

A perceivable spatial position of a sound source in the audio image of a binaural audio signal may be considered to depend on an inter-aural level difference (ILD) and the inter-aural time difference (ITD) between the two channels of the binaural audio signal. The ILD and ITD reflect the fact that a sound source in a certain position of the audio image emits an audio signal that is typically perceived by the left and right ears of the listener at slightly different times and at slightly different levels, as illustrated by the example of FIG. 1. Hence, the signal perceived at the right ear of the listener may be considered as a time-shifted and scaled version of the signal perceived at the left ear of the listener—and/or vice versa. The ITD typically has a(n absolute) value in order of few milliseconds at most. On the other hand, the ILD values typically indicate level differences around 0 to 20 dB, whereas ILD values up to 60 dB or even higher may be encountered.

The ITD and ILD may be frequency dependent, thereby suggesting possibly different values of the ITD and/or ILD related parameters at different frequency bands of the binaural audio signal for a given temporal segment—typically called a frame—of the binaural audio signal. Hence, for a given sound source in a given frame of a binaural audio signal, an ILD and/or an ITD may be determined for a number of frequency bands. In particular, for a given sound source in a given frame of a binaural audio signal segmented into a number of sub-bands covering the frequency band of interest, an ILD and/or an ITD may be determined for a subset of the frequency bands. As an example, ITD parameter may be considered as a dominant contributor to the perceived direction of arrival of a sound source at low frequencies, hence suggesting that an ITD may be determined for a subset of the sub-bands covering a predetermined portion of the frequency band of interest of the given frame, for example frequencies up to 2 kHz, whereas an ILD may be determined for another subset of the sub-bands or for all sub-bands of the given frame.

Figure 2A:
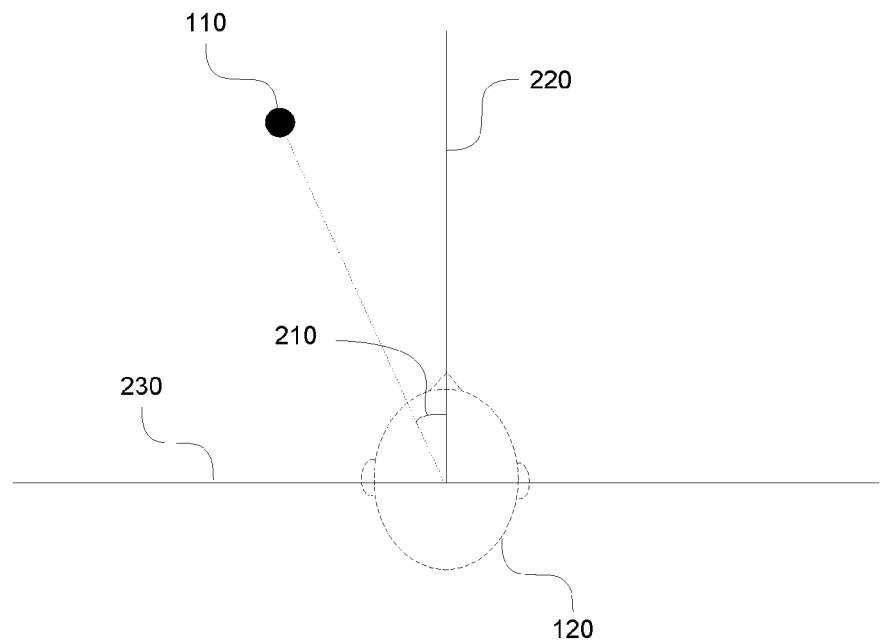
FIGS. 2a and 2b schematically illustrate a relationship between the position of a sound source and the listening position.
Figure 2B:
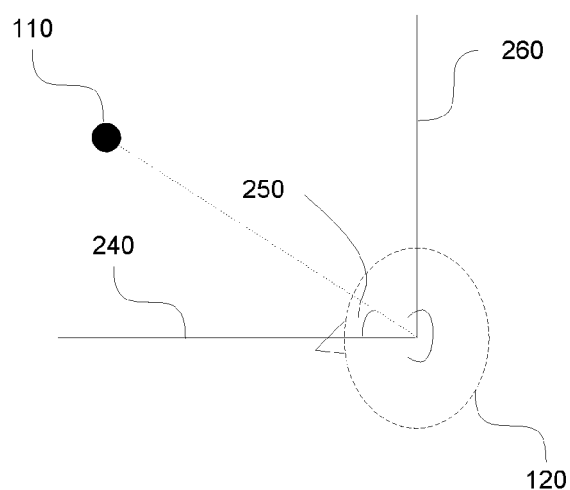

While the ILD and/or ITD parameters may be considered to accurately characterize a spatial position of a sound source in an audio image, they may not be fully intuitive way to characterize the spatial position e.g. for a human user. Instead, a spatial position of a sound source in an audio image of a multi-channel audio signal, e.g. in a binaural audio signal, may be indicated e.g. by a pair of angles. An example of such an approach is schematically illustrated in FIGS. 2a and 2b. FIG. 2a schematically illustrates a view from above the assumed position of a listener 120 with respect to a sound source 110 positioned in left front side of the listener 120. Line 220 represents a vertical plane (shown from above, hence as a line) perpendicular to the imaginary line 230 connecting the (assumed) positions of the ears of the listener 120, and the intersection of lines 220 and 230 represents the assumed listening point. Conceptually, FIG. 2a may be considered to depict the projection of the sound source 110 on a horizontal plane at the level of the (assumed) positions of the ears of the listener 120. Hence, for example an angle 210 between the line 220 and the line connecting the position of the sound source 110 to the assumed listening point may be employed to indicate the horizontal displacement of the position of the sound source 110 with respect to the (vertical) center axis of the audio image. Instead of angle 210 e.g. the angle between the line 230 and the line connecting the sound source 110 to the assumed listening point could be employed to indicate the horizontal displacement of the position of the sound source 110.

FIG. 2b schematically illustrates a view directly from left of the assumed position of the listener 120, i.e. a view along the line 230 of FIG. 2a. FIG. 2b depicts a line 240 representing the horizontal plane at the level of the (assumed) positions of the ears of the listener 120, whereas a line 260 represents a vertical plane at the (assumed) positions of the ears of the listener 120, the intersection of the lines 240 and 260 hence representing the assumed listening point. Conceptually, FIG. 2b may be considered to depict a vertical plane perpendicular to the imaginary line 230 connecting the (assumed) positions of the ears of the listener 120 and the projection of the sound source 110 on this plane. Note that this plane is the horizontal plane represented by the line 220 in FIG. 2a. Hence, for example an angle 250 between the line 240 and the line connecting the position of the sound source 110 to the assumed listening point may be employed to indicate the vertical displacement of the position of the sound source 110 with respect to the (horizontal) center axis of the audio image. Instead of angle 250 e.g. the angle between the line 260 and the line connecting the position of the sound source 110 to the assumed listening point could be employed to indicate the horizontal displacement of the position of the sound source 110.

Consequently, the angle 210 may be employed to indicate the perceivable direction of arrival of a sound source in the horizontal direction, i.e. a horizontal component of the direction of arrival, whereas the angle 250 may be employed to indicate the perceivable direction of arrival of the sound source in the vertical direction, i.e. the vertical component of the direction of arrival. The angles 210 and 250 may be considered as an intuitive way to characterize a spatial position to a human user. Moreover the angles 210 and 250 may be used as basis for visualizing a spatial position of a sound source on a display, as described hereinafter. The angles 210 and/or 250 may be determined on basis of the ILD(s) and/or ITD(s) by using respective predetermined mapping functions or on by using a predetermined joint mapping function.

The horizontal component of the direction of arrival and the vertical component of the direction of arrival, e.g. the angles 210 and 250 described hereinbefore, may be determined on basis of the original audio signal(s) as captured by a recording arrangement comprising a number of microphones arranged e.g. as a microphone array. A microphone array of three or more microphones having known positions with respect to each other may be needed in order to capture a direction of arrival with respect to a plane. As an example, three or more microphones arranged in a row, i.e. on a(n imaginary) line, in a horizontal direction may be employed to capture three or more audio signals that enable determination of the horizontal component of the direction of arrival of sound source, e.g. the angle 210. One or more of the three or more audio signals, together with the information regarding the horizontal component of the direction of arrival may be used as a basis for determination of a binaural audio signal representing the captured audio image. A similar arrangement of three or microphones arranged in a row in a vertical direction may be employed to capture there or more audio signals enabling determination of the vertical component of the direction of arrival of a sound source, e.g. the angle 250, thereby enabling determination of a binaural audio signal representing the captured audio image.

As another example, a microphone array of four or more microphones having known positions with respect to each other may be employed in order to capture four or more audio signals enabling determination of both the horizontal component of the direction of arrival of a sound source, e.g. the angle 210, and the vertical component of the direction of arrival of the sound source, e.g. the angle 250. Consequently, one or more of the four or more audio signals, together with the information regarding the horizontal and vertical components of the direction of arrival may be used as a basis for determination of a binaural audio signal representing the captured audio image.

A binaural audio signal may be obtained or composed for example by using a recording arrangement employing two microphones, arranged at the two ears of a human listener or in the 'ears' of an artificial head simulating a human listener, or by using another arrangement involving microphone positions simulating the positions of the ears of a human listener to capture sound(s) in a desired environment. Another example of a recording arrangement usable for capturing and generating a binaural audio signal is a microphone array comprising three or more microphones in known constellation providing three or more audio signals enabling determination and composition of a binaural audio signal, as described hereinbefore. Alternatively, a binaural audio signal exhibiting a sound source in a desired position of the audio image may be constructed manually. As an example, such a binaural audio signal may be constructed by using a suitable, preferably monophonic, audio signal as a source signal and creating a pair of audio signals based on the source signal, wherein the audio signals of the pair of audio signal exhibit, for each frequency band of interest, an ITD and an ILD resulting in the desired position of the sound source in the audio image. Consequently, one audio signal of the pair represents the left-channel signal of the binaural audio signal, whereas the other audio signal of the pair represents the right-channel signal of the binaural audio signal.

An audio signal, e.g. a binaural audio signal or other multi-channel audio signal, may comprise multiple audio sources with perceivable direction of arrival. Such an audio signal may be referred to as a spatial composite audio signal. A composite binaural audio signal may be obtained by using a recording arrangement described hereinbefore in an environment having multiple sound sources, thereby resulting in a 'natural' composite binaural audio signal. Alternatively, a composite binaural signal may be obtained by manual construction along the lines described hereinbefore by creating a pair of audio signals exhibiting ILD(s) and ITD(s) resulting in a desired position of the respective sound source in the audio image for each of the sound sources and combining the signals representing the left-channel signal into a single left-channel signal and combining the signals representing the right-channel signals into a single right-channel signal to form a composite binaural audio signal. Combining a number of signals may comprise e.g. summing or averaging the signals.

A composite audio signal may also be a single-channel signal comprising multiple audio sources. However, even though it is possible to provide information indicating a direction of arrival of a single-channel signal comprising a single sound source by providing suitable metadata therewith, it may not be possible to provide such indication for a single-channel composite audio signal comprising two or more sound sources. Consequently, a single channel composite audio signal may typically not be provided as a spatial composite audio signal.

Any audio signal captured in a natural environment using a recording arrangement described hereinbefore also comprises an ambient audio component in addition to one or more distinct sound sources. The ambient audio component typically comprises any environmental noises, reverberations of the distinct sources of the audio image due to objects present in the recording environment, etc. Due to the ambient component being part of a real-life a binaural audio signal captured in a natural environment, also man-made binaural audio signals are typically constructed to comprise an ambient audio signal component to improve the naturalness of the audio image. Such a man-made ambient audio component may be constructed for example as a linear combination of delayed copies of the one or more sound sources comprised in the composite binaural audio signal mixed together and scaled at the desired signal level to create an effect resembling the reverberations in a natural environment. The ambient audio component may be further complemented by including pre-recorded or artificially generated environmental background sounds and/or noise-type signal of desired frequency characteristics at a desired signal level to create an effect resembling a natural environment of desired characteristics.

An ambient audio component of a (composite) binaural audio signal typically exhibits relatively flat and slowly-varying frequency characteristics without a specific perceivable direction of arrival or position in the audio image, hence being a component of a (composite) binaural audio signal rather clearly distinct from the one or more distinct sound sources within the audio image of the (composite) binaural audio signal.

A binaural signal, and hence the audio image thereof, may be modified to include a further sound source at a desired position in the audio image. A sound source may be created by using a desired source audio signal as the basis for constructing a pair of audio signals exhibiting desired ILD(s) and/or ITD(s) to provide the left channel and right channel signals exhibiting the desired sound source in the desired position of the audio image. The left and right channel signals of the constructed pair may be combined with the respective channels of the original binaural audio signal to result in a modified binaural audio signal exhibiting a modified audio image wherein the desired sound source is inserted in its desired position. Quite naturally it is likewise possible to further modify a binaural audio signal wherein a desired sound source is inserted at a desired position in the audio image by inserting one or more further sound sources in their respective desired positions in the audio image.

A binaural signal, and hence the audio image thereof, may be modified by changing the signal level, i.e. the amplitude or the (relative) volume, of a sound source within the binaural audio signal. The modification of the signal level typically requires identification, separation and/or extraction of the audio signal components representing the sound source of interest in the two channels of the binaural audio signal, and scaling the identified audio signal components to a desired signal level before insertion back to the binaural audio signal. The identified audio signal components of interest may be provided e.g. as a pair of audio signals, one representing the left channel audio signal component and the other one representing the right channel audio signal component representing the sound source of interest. In particular, the modification may involve cancelling, e.g. subtracting, the respective audio signal components from the respective channels of the original binaural audio signal to result in an intermediate binaural audio signal, scaling the separated and/or extracted audio signal components to a desired signal level to result in modified audio signal components, and inserting the modified audio signal components back to the binaural audio signal to result in a modified binaural audio signal.

The scaling of the pair of audio signals representing the left and right channel components of extracted sound source should be performed in such a way that the ILD(s) and the ILD(s) of the audio signal components are kept essentially unchanged in order to guarantee keeping the sound source in its desired position in the audio image. The insertion of the audio signal components back to the binaural audio signal may involve combining, e.g. summing or averaging, each audio signal of the pair with the respective channel of the intermediate binaural audio signal.

Modifying a signal level of a sound source of interest in the audio image conceptually corresponds changing the perceived distance of the sound source with respect to the listening point: decreasing the signal level makes the sound source of interest to appear further away from the listening point, whereas increasing the signal level makes the sound source of interest to appear closer to the listening point.

As a specific example, modification of a binaural audio signal by changing the signal level of a sound source of a binaural audio signal may comprise cancelling a sound source from the binaural audio signal. This may be implemented for example by identifying and extracting the audio signal components representing the sound source of interest in the two channels of the original binaural audio signal into a pair of audio signals representing the audio signal components of the sound source of interest and subtracting each audio signal of the pair from the respective channel of the original binaural audio signal to result in a modified binaural audio signal from which the sound source of interest is essentially cancelled. While in a practical implementation it may not in all cases be possible to completely cancel the sound source of interest from the audio image, the cancellation is typically good enough for practical purposes due to ambient audio component and/or other sound sources of the binaural audio signal masking any possible remainder of the cancelled sound source.

A binaural audio signal, and hence the audio image thereof, may be modified by changing a position of a sound source within the binaural audio signal. Like in the case of modifying the signal level of a sound source within a binaural audio signal, modification of the binaural audio signal in order to change a position of a sound source of interest typically requires identification, separation and/or extraction of the audio signal components representing the sound source of interest in the two channels of the binaural audio signal, e.g. into a pair of audio signals, one representing the left-channel audio signal component and the other one representing the right-channel audio signal component associated with the sound source of interest. Consequently, the change of position may be implemented as cancellation of the sound source of interest in its original position in the audio image, e.g. as described hereinbefore, to result in an intermediate binaural audio signal, modifying the pair of audio signals representing the sound source of interest in its original position in the audio image in order to have a modified pair of audio signals exhibiting ITD(s) and/or ILD(s) corresponding to a desired position of the sound source of interest in the audio image, and combining, e.g. summing or averaging, each audio signal of the modified pair with the respective channel of the intermediate binaural audio signal to result in the modified binaural audio signal.

The modification of the pair of audio signals may comprise for example taking one signal of the pair of audio signals representing the sound source of interest in its original position in the audio image as a source signal. Another example is to temporally align the signals of the pair of signals representing the sound source in its original position in the audio image and to determine a linear combination, e.g. an average, of the temporally aligned signals as a source signal. The temporal alignment of the two signals of a pair may comprise time-shifting either one of the two signals by amount corresponding to the original ITD between the signals of the pair (possibly separately at a number of frequency bands?). The modification of the pair of audio signals may further comprise obtaining or determining the desired values of the ITD and ILD (across frequency bands?) corresponding to the desired position of the sound source of interest in the audio image and constructing a time-shifted and scaled version of the source signal, the source signal and the time-shifted and scaled version thereof hence forming the modified pair of signals representing the sound source of interest in the desired position in the audio image to be combined with the intermediate binaural audio signal.

A particular case of modification of a binaural audio signal to change a position of a sound source in the audio image is interchanging, i.e. swapping, positions of two sound sources within the binaural audio signal. The swapping of positions of a first sound source in a first position in the audio image and a second sound source in a second position in the audio image may be implemented for example by extracting the first sound source into a first pair of audio signals representing the first sound source in its original position in the audio image and extracting the second sound source into a second pair of audio signals representing the second sound source in its original position in the audio image. Consequently, the first pair of audio signals is used as basis for determining a modified first pair of audio signals exhibiting the ITD(s) and/or the ILD(s) corresponding to the second position in the audio image, i.e. to exhibit the ITD(s) and/or the ILD(s) of the second pair of audio signals. Similarly, the second pair of audio signals is used as basis for determining a modified second pair of audio signals exhibiting the ITD(s) and/or the ILD(s) corresponding to the first position in the audio image, i.e. to exhibit the ITD(s) and/or the ILD(s) of the first pair of audio signals. The first and second sound sources in their original positions in the audio image are cancelled as described hereinbefore to result in an intermediate binaural signal, and the modified first and second pairs of audio signals are combined with the intermediate binaural signal as described hereinbefore in order to determine the modified binaural audio signal exhibiting swapped positions of the first and second sound sources.

A binaural audio signal, and hence the audio image thereof, may be modified by replacing a sound source in its original position in the audio image with another audio signal not originally appearing in the binaural audio signal. This may be implemented for example by cancelling a sound source of interest as described hereinbefore and inserting a new sound source in the corresponding position in the audio image.

The new sound source may be determined as a pair of audio signals representing the new sound source in its desired position in the audio image along the lines of definition of the modified pair of audio signals described hereinbefore in context of changing a position of a sound source in the audio image by using a desired audio signal as the source signal.

A binaural audio signal, and hence the audio image thereof, may be modified by changing the frequency characteristics of a sound source within the binaural audio signal. The change of frequency characteristics may be implemented along the lines of change of signal level of a sound source described hereinbefore, wherein instead of scaling the extracted audio signal components e.g. a filter with desired frequency characteristics is applied to the pair of audio signals representing the audio signal components of the sound source of interest to result in the modified audio signal components to be combined with the intermediate binaural audio signal. The filtering may involve or may be followed by processing that ensures keeping the ITD(s) and/or the ILD(s) of the pair of audio signals essentially unchanged in the modified pair of audio signals to guarantee keeping the sound source in its original position in the audio image.

Extraction of a sound source from a binaural signal comprising only a single sound source and modification of this sole sound source of such binaural signal are rather straightforward operations due to the audio signal components representing the sole directional sound source in the audio image being the only audio signal components different from the ambient audio component, which typically exhibits stationary or slowly-varying frequency characteristics thereby making the ambient audio component readily detectable component of the audio image.

In contrast, extraction of a sound source from a composite binaural signal comprising two or more sound sources and modification of one or more of the two or more sound sources of such binaural audio signal may be computationally rather intensive operations. Techniques of identifying, separating and/or extracting a sound source from a composite binaural audio signal comprising two or more sound sources are known in the art. A non-limiting example of such a technique is provided in Ron J. Weiss, Michael I. Mandel, Daniel P. W. Ellis, "Source separation based on binaural cues and source model constraints", LabROSA, Department of Electrical Engineering, Columbia University, New York, N.Y., 10027.

The discussion hereinbefore mainly referring to a binaural signal equally applies to multi-channel audio signals of three or more channels. However, in case of audio signals of more than two channels the considerations with respect to determining ITD(s) and/or ILD(s) corresponding to a sound source and/or determining or providing audio signal components with desired ITD(s) and/or ILD(s) involve consideration of the ITD(s) and/or ILD(s) between channels of a number of channel pairs of the multi-channel audio signal, or consideration of the ITD(s) and/or ILD(s) of the (other) channels of the multi-channel audio signals with respect to a reference channel, instead of consideration of the ITD(s) and/or ILD(s) between a single pair of channels of a binaural audio signal.

Figure 3:
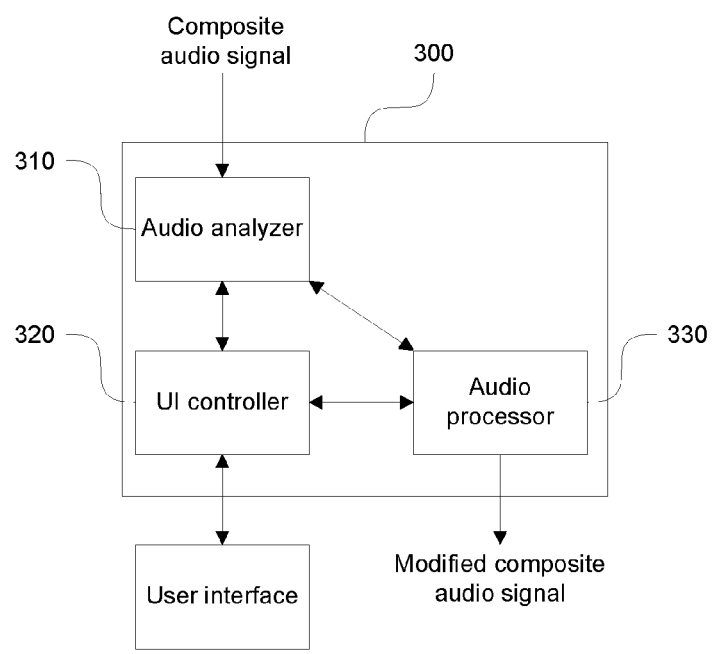
FIG. 3 schematically illustrates an apparatus in accordance with an embodiment of the invention.

FIG. 3 schematically illustrates an audio processing apparatus 300 in accordance with an embodiment of the invention. The apparatus 300 comprises an audio analyzer 310, a user interface controller 320 and an audio processor 330. The audio analyzer 310 is operatively coupled to the user interface controller 320 and the user interface controller 320 is operatively coupled to the audio processor 330. The audio analyzer 310 may be operatively coupled to the audio processor. The processing units of the apparatus 300 operatively coupled to each other may be configured and/or enabled to exchange information and/or instructions therebetween.

The audio analyzer 310 may also be referred to as an audio analysis unit. The user interface controller 320 may also be referred as a user interface control unit, a UI controller or a UI control unit. The audio processor 330 may be also referred to as an audio processing unit, an audio modifier or an audio modification unit.

The apparatus 300 may comprise further components, such as a processor, a memory, a user interface, a communication interface, etc. The user interface may comprise a display, a keyboard, a keypad or a corresponding arrangement of keys, a mouse or a corresponding pointing device, a touchpad, a touchscreen, etc. In particular, the apparatus 300 may receive input from one or more external processing units and/or apparatuses and the apparatus 300 may provide output to one or more external processing units and/or apparatuses.

In particular, the apparatus 300 may comprise a recording arrangement that enables capturing of multi-channel audio signals for capturing a composite audio signal. The recording arrangement may comprise for example a pair of microphones or a microphone array. Alternatively, the apparatus 300 may be coupled or connected to another device equipped with a suitable recording arrangement. Consequently, the apparatus 300, for example the audio analyzer 310, may be configured to receive a composite audio signal directly (or via a suitable buffer) from the recording arrangement, thereby enabling 'live' processing of the composite audio signal.

Alternatively or additionally, the apparatus 300, for example the audio analyzer 310, may be configured to read a composite audio signal from a file or from other suitable data structure stored in a memory and/or to write a composite audio signal to a file or to other suitable data structure in the memory. The memory may be comprised in the apparatus 300 or in another apparatus to which the apparatus 300 is coupled or connected.

Hence, the apparatus 300 may be configured to process a composite audio signal while it is being received or played back, i.e. to perform 'on-line' processing of the composite audio signal, and/or the apparatus 300 may be configured to process a composite audio signal read from a memory, i.e. to perform 'off-line' processing of the composite audio signal. The apparatus 300, for example the audio analyzer 310, may be configured to write a captured, received or modified composite audio signal to the memory.

The composite audio signal may be for example a multi-channel audio signal comprising two or more channels or a binaural audio signal, as described in detail hereinbefore.

A composite audio signal may be a stand-alone audio item, i.e. not associated with a specific additional item of media data, or a composite audio signal may be associated with another item of media data, such as a sequence of images or a segment of video signal. In particular, a composite audio signal may be associated with a segment of video signal having similar or essentially similar duration as the composite audio signal, the composite audio signal and the video signal hence constituting an audio-visual item with synchronized audio and video components.

The audio analyzer 310 may be configured to obtain information indicative of a spatial position of a sound source in a composite audio signal and to obtain type of the sound source. As described hereinbefore, the spatial position of a sound source may also be referred to e.g. as a (spatial) position of the sound source in the audio image. The composite audio signal may comprise one or more sound sources, each sound source having a respective spatial position in the audio image in the composite audio signal. The audio analyzer 310 may be configured to obtain information identifying the spatial position of a single sound source, a subset of the sound sources or all the sound sources comprised in the composite audio signal and type(s) thereof.

As an example, for a composite audio signal associated (and possibly synchronized) with a segment of video signal, the audio analyzer 310 may be configured to obtain information identifying the spatial positions of one or more sound sources depicted in the segment of video signal and types thereof while disregarding the sound sources that are not within the field of view represented by the segment of video signal. As another example, the audio analyzer 310 may be configured to obtain information identifying the spatial positions of one or more sound sources of one or more predetermined types while disregarding the sound sources not representing the one or more predetermined types from further processing.

The type of a sound source of a composite audio signal may indicate general characteristics of the respective sound source. The information indicative of the type of a sound source typically indicates the sound source to represent one of one or more predetermined types of sound sources. In case the type of a sound source cannot be identified, the information indicative of the type of sound source may indicate an unknown type for the respective sound source.

As an example, the type of a sound source may indicate characteristics of the sound source at a high level, e.g. by indicating a sound source to be a person, an animal, a vehicle, a machine, an environmental sound source, etc. As another example, the type of a sound source may indicate characteristics of the sound source at a bit more detailed level, e.g. by indicating a sound source to be an adult, a child, female, male, a dog, a cat, a horse, a car, a certain piece of machinery, a sound originating from a stream or a waterfall, etc. As a yet another example, the type of a sound source may indicate characteristics of the sound source at a personal level, e.g. by identifying the sound source to be a specific person. Moreover, regardless of the level of detail of classification of the sound sources, a sound source may be indicated to be of unknown type.

Obtaining the information indicative of the spatial position of a sound source of interest and/or the type of the sound source of interest may comprise analyzing or evaluating metadata associated with the composite audio signal. Such metadata may comprise information regarding one or more sound sources of the composite audio signal, information regarding the ambient audio component of the composite audio signal, channel configuration of the composite audio signal, origin of the composite audio signal, duration of the composite audio signal, encoding/decoding format of the composite audio signal, etc. Information regarding a sound source of the composite audio signal may comprise information regarding a spatial position of the sound source, type of the sound source, (relative) signal level of the sound source, frequency characteristics of the sound source, ILD and/or ITD parameter(s) characterizing the spatial position of the sound source, origin of the sound source, etc. The metadata associated with the composite audio signal may have been determined by pre-analysis of the composite audio signal at the audio analyzer 310, at another processing unit or entity of the apparatus 300, or at a processing unit or entity of another apparatus.

Alternatively or additionally, obtaining the information indicative of the spatial position of a sound source of interest may comprise analyzing the audio signal content of the composite audio signal in one or more of the channels of the composite audio signal. The analysis of the audio signal content may comprise for example analyzing the audio signal in one or more of the channels of the composite audio signal in order to identify one or more sound sources and respective spatial positions thereof in the composite audio signal. In particular, the analysis of the audio signal content may comprise extracting one or more audio signal components representing a sound source of interest from the composite audio signal and analyzing the one or more audio signal components in order to obtain information indicative of the spatial position of the sound source of interest, as described hereinbefore. The spatial position of the sound source may be indicated for example using the ILD(s) and ITD(s) for a number of frequency bands for one or more channel pairs of the multi-channel composite audio signal. As an alternative, or addition, the spatial position of the sound source may be indicated in a different manner, for example as a direction with respect to a reference direction and a (relative) distance from the listening point. The direction may be indicated for example by one or more angles with respect to respective reference directions, such as angles 210 and 250 discussed hereinbefore.

Similarly, obtaining the information indicative of the type of a sound source of interest may comprise analyzing the audio signal content of the composite audio signal or the content of the audio signal components extracted or separated from the composite audio signal. A sound source may be classified to represent a certain type of sound in case the respective audio signal components exhibit audio signal characteristics associated with the certain type of sound. Such audio signal characteristics may include frequency characteristics, temporal characteristics and/or characteristics or parameter derivable from the frequency and/or temporal characteristics. Audio signal characteristics associated with a certain type of sound may be obtained for example from a database containing descriptions of sound sources of different type. Techniques for classifying a sound source to represent a certain type of sound are known in the art. Non-limiting examples in this regard are provided e.g. in K. Umapathy et al., "Audio Signal Feature Extraction and Classification Using Local Discriminant Bases", IEEE TRANSACTIONS ON AUDIO, SPEECH, AND LANGUAGE PROCESSING, VOL. 15, NO. 4, May 2007, N. Zhou et al., "Enhanced Class-dependent Classification of Audio Signals", 2009 World Congress on Computer Science and Information Engineering, Wen-Hung Liao, YiSyuan Su, "Classification of Audio Signals in All-Night Sleep Studies", The 18th International Conference on Pattern Recognition (ICPR'06), and Rainer Martin and Anil Nagathil, "CEPSTRAL MODULATION RATIO REGRESSION (CMRARE) PARAMETERS FOR AUDIO SIGNAL ANALYSIS AND CLASSIFICATION", ICASSP 2009.

The analysis of the audio signal content may comprise for example analyzing the audio signals in one or more of the channels of the composite audio signal or in one or more audio signal components extracted or separated from the composite audio signal in order to identify audio characteristics meeting criteria associated with one of one or more predetermined types. In case audio characteristics meeting the criteria associated with a given predetermined type are encountered, the respective sound source may be classified to be of the given type, whereas in case the audio characteristics of a sound source do not fall within any of the predetermined types the sound source may be classified to be of unknown type.

The user interface controller 320 may be configured to determine a position in a display of an apparatus, for example a display of the apparatus 300, indicative of the spatial position of a sound source, and to cause the apparatus to display an item representing the sound source in the determined position of the display. The item representing the sound source is preferably determined or selected on basis of the type of the sound source. In particular, the user interface controller 320 may be configured to determine the position in the display indicative of the spatial position of a sound source and cause displaying a respective item for a number of sound sources, e.g. for each of the one or more sound sources for which the spatial position in the audio image and type of the sound source have been determined by the audio analyzer 310.

Preferably, the position of an item in a first direction of the display is directly proportional to the horizontal component of the spatial position of the corresponding sound source. Additionally or alternatively, the position of the item in a second direction of the display may be directly proportional to the vertical component of the spatial position of the corresponding sound source. In other words, the position of an item in the display may indicate the horizontal component of the spatial position of a sound source represented by the item, the vertical component of the spatial position of the sound source represented by the item, or both the horizontal and vertical components of the spatial position of the sound source represented by the item. The first direction of the display may be in parallel with lower and upper edges of a (rectangular) display, whereas the second direction may be in parallel with side edges of the (rectangular) display. Hence, the first direction may be referred to as a horizontal direction of the display and the second direction may be referred to as vertical direction of the display, assuming that the apparatus/display is in an upright position. In this regard, the display may represent the full 180 degrees of the audio image in the horizontal direction such that a horizontal position in the display directly corresponds to the spatial position of the sound source in the audio image in the horizontal direction. As an example, a position in the left (right) boundary of the display may correspond to a spatial position directly left (right) from the listening point, whereas a position in the middle of the display in the horizontal direction corresponds to a spatial position directly in front of the listening point. In a similar manner, the display may represent the full 180 degrees of the audio image in the vertical direction such that e.g. a position in the upper (lower) boundary of the display corresponds to a spatial position directly above (below) the listening point, whereas a position in the middle of the display in the vertical direction corresponds to a spatial position directly in front of the listening point.

Figure 4:
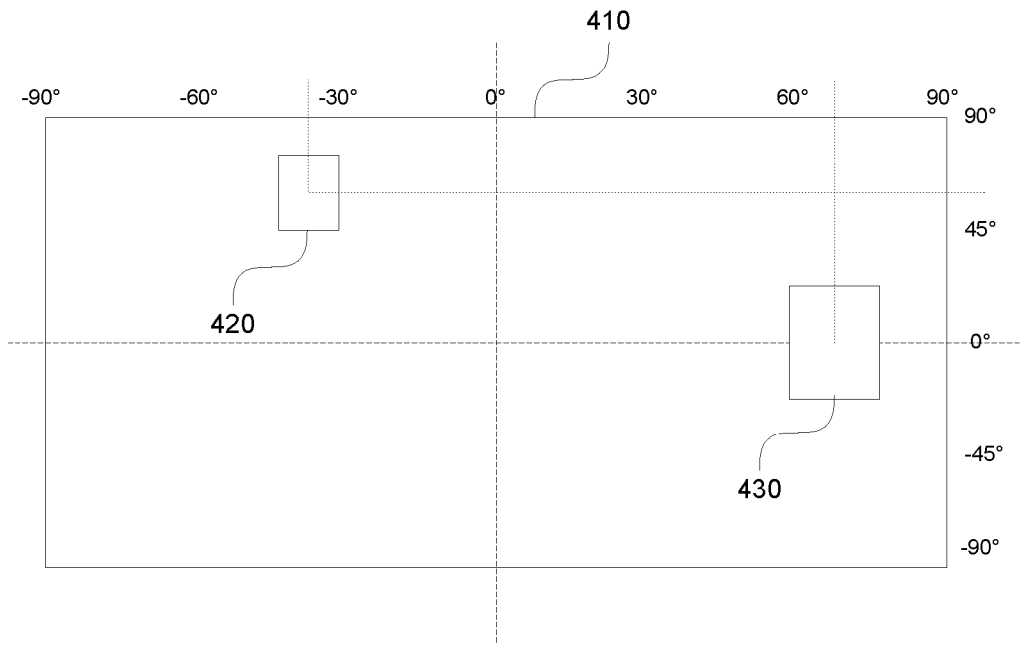
FIG. 4 schematically illustrates an example of the position of an item representing a sound source on a display.

A position of the item representing a sound source in a display is schematically illustrated by an example in FIG. 4, depicting an item 420 in the display 410, the item 420 being indicative of the spatial position of a sound source of interest. The horizontal and vertical dashed lines indicate the respective (imaginary) center axes of the audio image. Moreover, the scales from −90 to 90 degrees in vertical and horizontal directions illustrate the relationship between a position of an item in the display 410 and the corresponding angles indicating the respective perceivable direction of arrival of the sound source represented by the item. Thus, the exemplifying item 420 indicates a perceivable direction of arrival of approximately 35 degrees left from the vertical center axis of the audio image and approximately 60 degrees above the horizontal center axis of the audio image, i.e. the sound source represented by the item 420 is positioned in the audio image in the left side above the listening point. FIG. 4 further illustrates another item 430 indicative of the spatial position of a second sound source of interest on the horizontal center axis of the audio image approximately 63 degrees right from the vertical center axis of the audio image, i.e. the second sound source of interest is positioned in the audio image in the right side at the level of the listening point.

Instead of the display representing the full 180 degrees of audio image in horizontal and/or in vertical directions, the scale of the display may be adapted to the observed positions of the sound sources in the composite audio signal of interest. As an example, a sound source furthest away from the respective center axis of the audio image may be used to set the absolute value of the end points of the scale used in the display in the respective direction. For example, in FIG. 4 the item 430 positioned approximately 63 degrees left from the center axis could be used as basis for setting the scale of positions in the display from −63 to 63 degrees or to a slightly wider scale, e.g. from −65 to 65 degrees, whereas the item 420 positioned approximately 60 degrees above the center axis could be used as basis for setting the scale of positions in the display from −60 to 60 degrees.

As another example of a scale of positions different from the full 180 degrees of audio image in horizontal and/or vertical directions, a predetermined scale or predetermined scales may be employed. The predetermined scale or scales may be determined, for example, on basis of a field of view provided by an image or a video segment associated with the composite audio signal, the predetermined scale or scales thereby corresponding to the field of view of the image or the video segment. Consequently, the items representing the spatial positions of the sound source that are outside the field of view of the image or the video segment are not displayed. Instead, an item representing a spatial position of a sound source being outside the audio image currently represented in the display may be displayed, such item possibly further providing an indication of the spatial position of the respective sound source.

Instead of the full display being used to represent the audio image of the composite audio signal, e.g. a window or a corresponding item covering a desired portion of the display may be used to represent the audio image of the composite audio signal.

In case there is an image or a video segment associated with the composite audio signal, the image or the video segment may be displayed on the display together with the one or more items representing respective sound sources of the composite audio signal. In particular, the one or more items representing the respective sound sources of the composite audio signal are positioned in the display such that their positions essentially coincide with positions of the respective objects of the displayed image or a video segment.

The item representing a sound source may comprise an image, text and/or other information indicative of the respective sound source and/or the type of the sound source. Each of the one more predetermined types of sound sources may have e.g. a predetermined image and/or a predetermined piece of text indicative of the respective type of sound source associated therewith. The predetermined images and/or pieces of text may be stored in a memory of the apparatus 300 or in a memory of another apparatus accessible by the user interface controller 320. The item may comprise a figure, e.g. an icon, comprising a shape illustrating the respective type, e.g. a human shape illustrating a person as the sound source, a dog illustrating an animal as the sound source, a car illustrating a vehicle as the sound source, a question mark illustrating a sound source of unknown or unidentifiable type—each possibly provided together with a short explanatory text (e.g. "person", "animal", "vehicle"; "unknown", . . . ). As another example, the item may comprise an image and/or name of a specific person in case such information is available or otherwise identifiable on basis of the sound source or on basis of an image and/or video segment associated with the composite audio signal comprising the sound source.

Alternatively or additionally, the item representing the sound source may comprise any information e.g. available in the metadata that may be associated with the composite audio signal and the sound sources comprised therein and/or any information that may be extracted by audio signal analysis of the composite audio signal and/or on basis of analysis of an image and/or video segment associated with the composite audio signal.

The item representing the sound source and/or e.g. an image comprised therein may have a size that is proportional to its relative signal level in the audio image. In other words, in case a first sound source in an audio image exhibits higher signal level, e.g. average energy, than a second sound source in the audio image, the item representing the first sound source may be larger in size than the item representing the second sound source—and vice versa.

Figure 5:
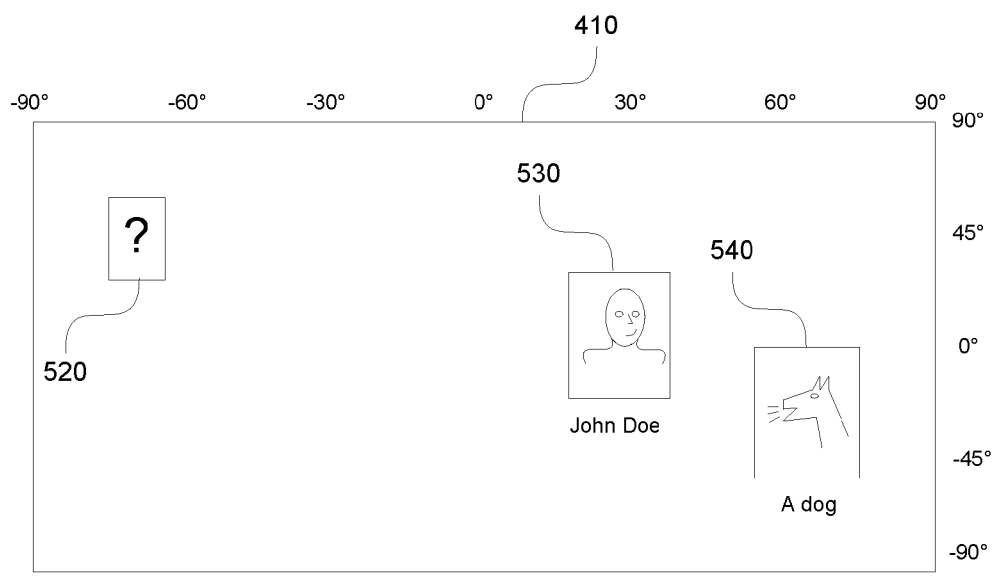
FIG. 5 schematically illustrates an example of items representing sound sources depicted on a display.

An example of items representing sound sources is provided in FIG. 5. The display 510 depicts three items, each representing a respective sound source of a composite audio signal: item 520 depicts a question mark as an indication of a sound source of unidentified type, item 530 depicts a person who has been identified and hence also the name of the person is provided as part of the item 530 together with the image of the person, and item 540 depicts a generic figure of a dog indicating a sound source that has been identified as a (barking) dog. While the items 530 and 540 are depicted as having essentially similar sizes, hence indicating essentially similar signal levels for the corresponding sound sources, the item 520 is depicted as smaller than the two other items, indicating that the sound source represented by the item 520 has a lower signal level—and hence presumably appears to be further away from the listening point—than the other two items.

The user interface controller 320 may be configured to receive an indication of a user action associated with an item representing a sound source of the composite audio signal. The sound source subjected to a user action may be referred to as a selected sound source.

The user interface controller 320 may be further configured to determine an indication of a user selected modification of the audio image on basis of the received indication of the user action associated with the item representing the selected sound source of the composite audio signal. The user selection may involve the user using a mouse, a touchpad or a corresponding arrangement together with a respective action button to make the selection. Additionally or alternatively, the user selection may involve the user using a finger, a stylus or a corresponding pointing device to perform an action on a touchscreen to make the selection.

The indication of the user action may comprise an indication of the user 'pinching' 13 or having 'pinched'—an item representing the selected sound source and the extent of 'pinching'. Consequently, the respective user selected modification of the selected sound source may comprise an indication or a wish to change the signal level of the sound source of interest in accordance with the extent of pinching.

The 'pinching' may involve the user placing two fingers on a portion of a touchscreen display depicting the item indicative of the sound source of interest, sliding the two fingers along the surface of the touchscreen further apart from each other, and lifting the one or both fingers from the surface of the touchscreen, resuiting in an indication of the user selected modification to indicate a wish to change the level of the selected sound source to a higher level. The extent of 'pinching' may indicate the distance of sliding the two fingers further apart from each other along the surface of the touchscreen, or it may merely indicate the fact that a 'pinching' involving sliding the fingers further apart has taken place. Consequently, the resulting change of level may be directly proportional to the extent of 'pinching', i.e. the extent of movement of the two fingers further apart from each other from their initial position on the touchscreen, or the resulting change of level may be a predetermined step towards a higher level, respectively.

On the other hand, the 'pinching' may involve the user placing two fingers on a portion of a touchscreen display depicting the item indicative of the sound source of interest, sliding the two fingers along the surface of the touchscreen closer to each other, and lifting one or both fingers from the surface of the touchscreen, resulting in an indication of the user selected modification to indicate a wish to change the level of the selected sound source to a lower level. The extent of 'pinching' may indicate the distance of sliding the two fingers closer to each other along the surface of the touchscreen, or it may merely indicate the fact that a 'pinching' involving sliding the fingers closer to each other has taken place. Consequently, the resulting change of level may be directly proportional to the extent of 'pinching', i.e. the extent of movement of the two fingers closer to each other from their initial position on the touchscreen, or the resulting change of level may be a predetermined step towards a lower level, respectively.

The user interface controller 320 may be configured, in response to a user 'pinching' an item in the display, to cause the apparatus 300 to change the size of the item in the display in accordance with the direction and/or the extent of 'pinching'.

The indication of the user action may comprise an indication of a user moving an item representing a selected sound source into a second position in the display. Consequently, the respective indication of the user selected modification comprises an indication to change the spatial position of the selected sound source to correspond to the second position in the display. Hence, the user action may comprise the user 'dragging and dropping' the item representing the selected sound source displayed on the display from its original position to a second position in the display, where the second position in the display is indicative of the user selected new spatial position of the selected sound source in the audio image.

Figure 6:
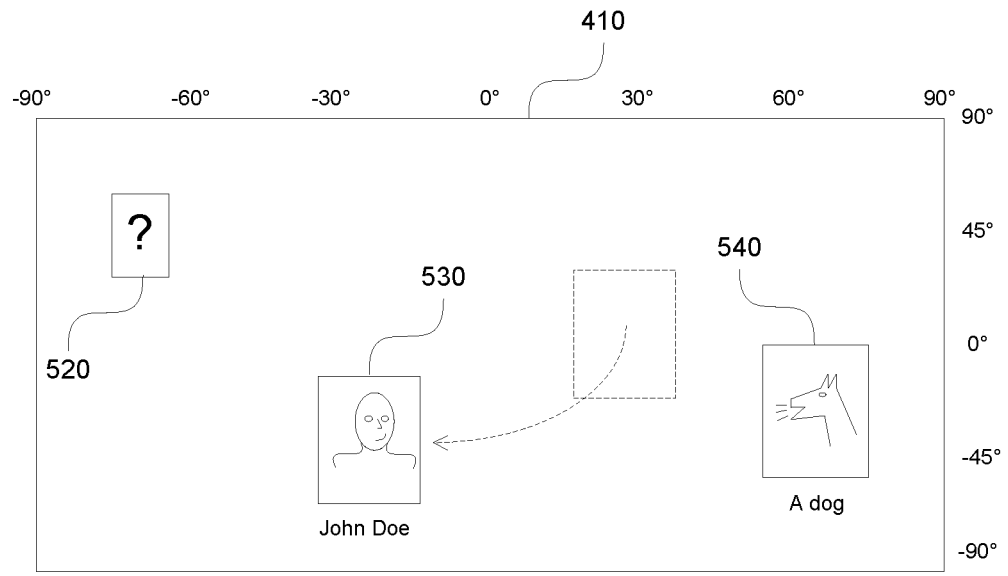
FIG. 6 schematically illustrates an example of moving an item representing a sound source from its original position to a new position.

In particular, the user action may comprise the user placing a finger, a stylus or a corresponding pointing device on a portion of a touchscreen display depicting the item representing the selected sound source, sliding the finger/stylus along the surface of the touchscreen to a desired position, and lifting the finger/stylus from the touchscreen at the desired position thereby indicating the second position in the display. Similar operation may be implemented using a mouse, a touchpad or a corresponding arrangement by the user moving the cursor on a portion of a display depicting the item representing the selected sound source, pressing the action button of the mouse/touchpad to select to item, using the mouse/touchpad to move the cursor/item to a desired position, and releasing the action button at the desired position thereby indicating the second position in the display. FIG. 6 schematically illustrates moving the item 530 from its original position to a new position.

The user interface controller 320 may be configured, in response to a user 'dragging and dropping' an item in the display from its original position to a second position, to cause the apparatus 300 to display the item in the second position instead of the original position.

The indication of the user action may comprise an indication of the user selecting an item representing a selected sound source. The selection may comprise the user using a mouse, a touchpad or a corresponding arrangement to move the cursor on a portion of the display depicting the item representing the selected sound source and pressing and releasing, e.g. clicking or double-clicking, the action button of the mouse/touchpad while the cursor remains on or in immediate proximity of the portion of the display depicting the item representing the selected sound source. Similar operation may be performed by using a finger, a stylus or a corresponding pointing device on a touchscreen e.g. by placing the finger/stylus on a portion of a touchscreen display depicting the item representing the selected sound source and lifting the finger/stylus from the touchscreen while the finger/stylus remains on or in immediate proximity of the portion of the display depicting the item representing the selected sound source.

The user interface controller 320 may be configured to cause the apparatus 300 to display, in response to a user selecting an item representing a selected sound source, a number of options for modification of the selected sound source and, consequently, the indication of the user selected modification may comprise, in response to a user selecting one of the number of options, an indication of the user selected option. The indication of the user selected modification may further comprise a parameter associated with the user selected option.

The number of options may be displayed as a list of options, formatted e.g. as a menu, overlaid on the portion of the display depicting the item representing the selected sound source or in its proximity. Alternatively, the list of options may be displayed elsewhere in the display, for example a dedicated window, provided with a title identifying the selected sound source may be opened in predetermined or random position of the display. As a yet further alternative, the list of options may be displayed in a predetermined portion of the display, formatted as a menu or using another suitable format. Consequently, the user may use a mouse, a touchpad, a finger, a stylus, etc. to select an option from the list of options.

The number of options may comprise for example an option to replace the selected sound source with a second sound source, an option to change the signal level of the selected sound source, an option to change the spatial position of the selected sound source, an option to introduce a new sound source to the audio image, an option to cancel or remove the selected sound source from the audio image or any combination thereof, possibly together with one or more further options.

Figure 7:
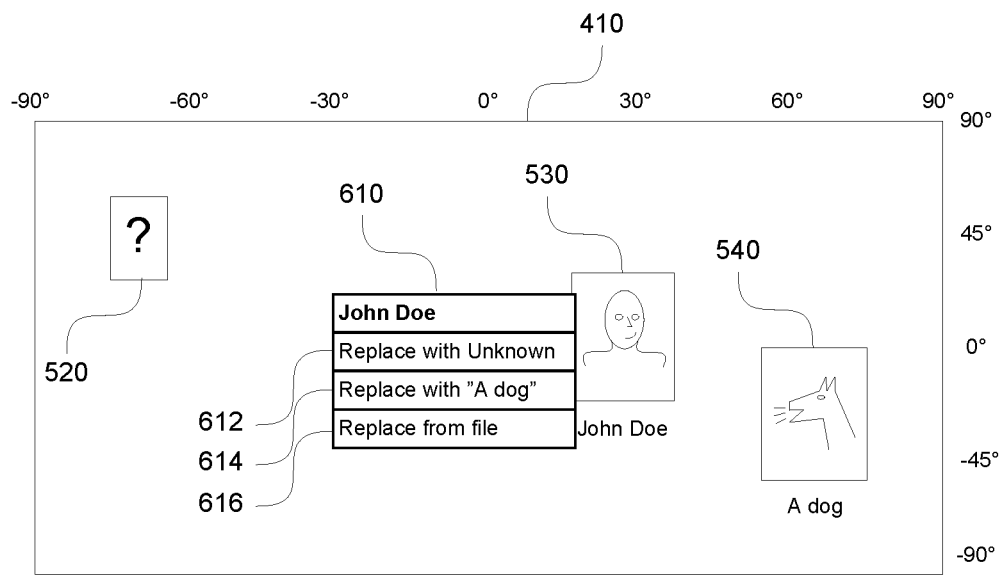
FIG. 7 schematically illustrates an example of options to replace a sound source with a second sound source.

As an example of the options displayed to the user on the display, the option to replace a sound source with a second sound source may comprise an option to replace the selected sound source with another sound source of the composite audio signal. Alternatively or additionally, the option to replace a sound source may comprise an option to replace the selected sound source with a sound source that is independent of the composite audio signal, for example with a sound source stored in a memory of the apparatus 300 or in a memory of another apparatus accessible by the apparatus 300. The option to replace a sound source with a second sound source may comprise a number of sub-options, as schematically illustrated by an example in FIG. 7. The list of options 610 provides an option to replace the selected sound source, i.e. the sound source represented by the item 530, including a number of sub-options: an option 612 to replace the selected sound source with the sound source of unidentified type of the composite audio signal represented by the item 510, an option 614 to replace the selected sound source with the sound source represented by the item 540 identified as a dog, and an option 616 to replace the selected sound source with a sound source stored in a file. In response to user selecting the option 616, the apparatus 300 may be configured to open a list of sound sources available at the apparatus 300 or to open a selection window or a corresponding arrangement enabling the user to browse files stored in a memory in order to choose a desired sound source. An indication of the user chosen sound source to be used to replace the selected sound source may be included as parameter in the indication of the user selected modification of the audio image.

The user interface controller 320 may be configured, in response to a user selecting an option to replace the selected sound source with another sound source of the composite audio signal, to cause the apparatus to interchange the positions of the respective items on the display. The user interface controller 320 may be configured, in response to a user selecting an option to replace the selected sound source with a sound source independent of the composite audio signal, to determine the type of the new sound source and cause the apparatus 300 to display an item representing the new sound source, the item being determined on basis of the type of the new sound source, instead of the item representing the selected sound source.

Figure 8:
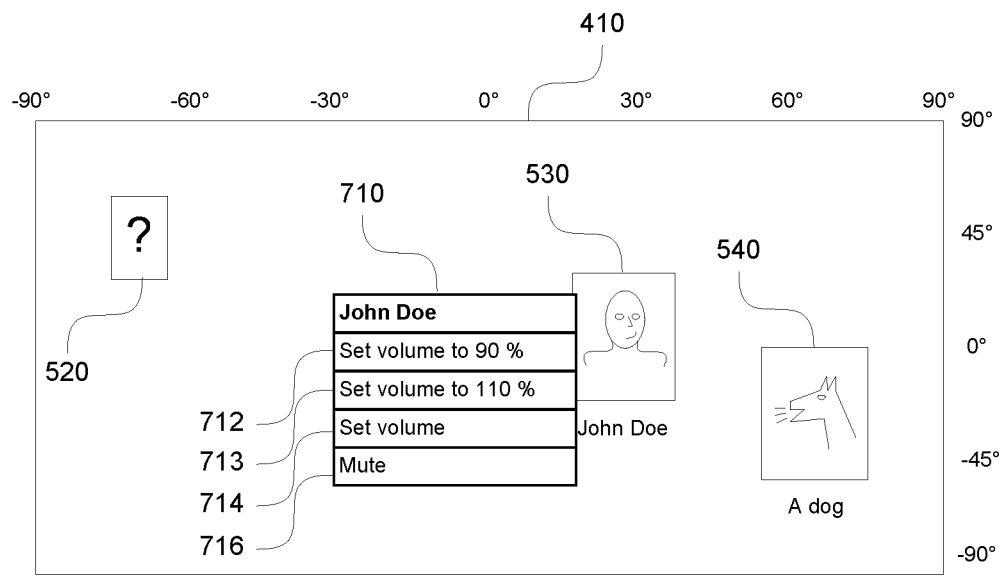
FIG. 8 schematically illustrates an example of options to change the signal level of a sound source.

As another example of the options displayed to the user on the display, the option to change the signal level of the selected sound source may comprise a number of sub-options, for example an option to decrease the signal level by a predetermined amount, an option to increase the signal level by a predetermined amount and/or an option that enables a user to provide an indication of the desired signal level. FIG. 8 schematically illustrates an example of sub-options to change the signal level of the selected sound source as an exemplifying list of options 710 comprising an option 712 to change the signal level of the selected sound source to 90% of the current signal level, an option 714 to change the signal level of the selected sound source to 110% of the current signal level and an option 716 enabling provision of a desired signal level, e.g. as a percentage of the current signal level, by the user. Moreover, the list of options 710 comprises an option 718 that enables muting, e.g. cancelling or removing, the selected sound source from the audio image. In response to user selecting the option 716, the apparatus 300 may be configured to open a selection window or a corresponding arrangement that enables the user to provide the desired signal level. An indication of the desired signal level or a change thereof may be included as parameter in the indication of the user selected modification of the audio image.

The user interface controller 320 may be configured, in response to a user selecting an option to change the signal level of the selected sound source, to cause the apparatus 300 to change the size of the respective item in the display in accordance with the new level of the selected sound source. Similarly, the user interface controller 320 may be configured, in response to a user selecting an option to cancel the selected sound source from the audio image, cause the apparatus 300 to remove the respective item from the display.

The audio processor 330 may be configured to receive or obtain the indication of the user selected modification of the audio image and to modify the composite audio signal in accordance with the user selected modification.

Depending on the user selection, the processing to modify the composite audio signal resulting from the user selected modification may involve, as described hereinbefore, changing a signal level of the selected sound source, repositioning the selected sound source in a new spatial position in the audio image, interchanging the spatial position of the selected sound source with that of another sound source of the composite audio signal, replacing the selected sound source with a sound source independent of the composite audio signal, cancellation of the selected sound source, introduction of a new sound source to the composite audio signal, etc.

The audio processor 330 may be configured to modify the audio signal content of the composite audio signal, as described hereinbefore, in order to implement the user-selected modification of the audio image. Alternatively or additionally, the audio processor 330 may be configured to modify or introduce metadata associated with the composite audio signal to modify or indicate the characteristics of the composite audio signal and/or one or more sound sources comprised therein to account for and/or to indicate the user-selected modification of the audio image.

In case the modified characteristics of the composite audio signal are indicated in the metadata only, the apparatus 300, or another apparatus, may be configured to modify the audio signal content of the composite audio signal upon playback of the composite audio signal in order to realize the indicated modifications into audible form.

Figure 9:
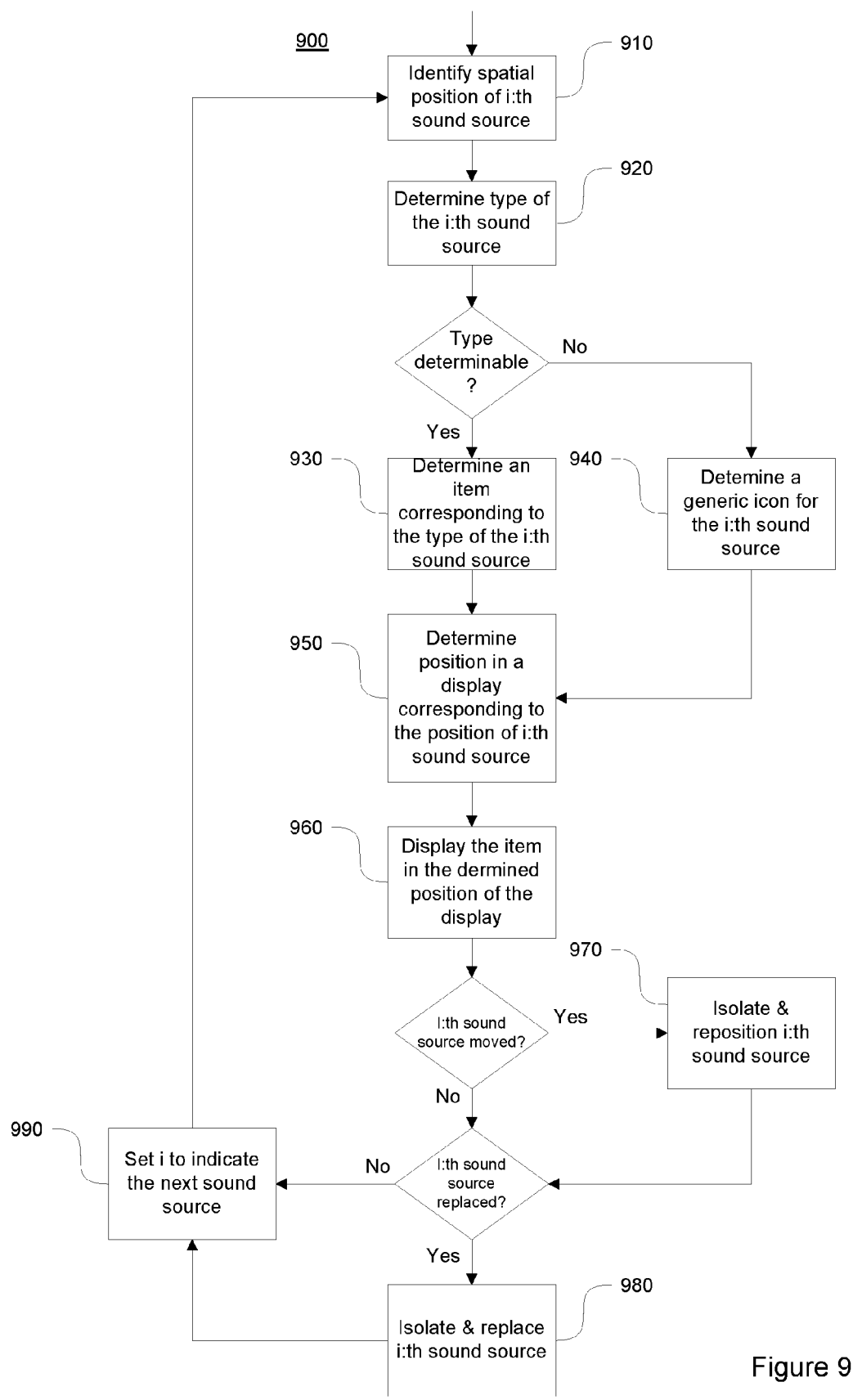
FIG. 9 illustrates an exemplifying process in accordance with an embodiment of the invention.

The operations, procedures and/or functions carried out by an apparatus during playback of a composite audio signal in accordance with an embodiment of the invention are described in the following with references to an exemplifying process 900 illustrated by a flowchart of FIG. 9.

In accordance with the exemplifying embodiment of the invention, an apparatus, such as the apparatus 300, may be configured to access a memory storing a composite audio signal comprising one or more sound sources. Moreover, the memory may also store metadata associated with the composite audio signal and/or with the sound sources of the composite audio signal.

The process 900 may start by setting an identifier i to indicate a first sound source of the composite audio signal (e.g. i=1). The apparatus may be configured to identify the spatial position of the sound source i in the audio image of the composite audio signal, as indicated in step 910. The apparatus may be further configured to determine—or attempt to determine—the type of the identified sound source i, as indicated in step 920. In case the type of the sound source i is determinable, the apparatus may be configured to determine and/or obtain an item representing the sound source i on the display, as indicated in step 930. In contrast, in case the type of the sound source i cannot be determined, the apparatus may be configured to determine and/or obtain a generic icon to represent the sound source i on the display, as indicated in step 940.

The apparatus may be further configured to determine a position of a display corresponding to the spatial position of the sound source i, as indicated in step 950, and the apparatus may be configured to display the item representative of the sound source i in the display, as indicated in step 960. The apparatus may be further configured to identify—e.g. on basis of the metadata associated with the composite audio signal or sound sources comprised in the composite audio signal or on basis of a command or indication received from a user interface of the apparatus—whether the sound source i is to be repositioned from its original position. In case an indication to reposition the sound source i is identified, the indication may further comprise indication of the new spatial position of the sound source i in the audio image. The apparatus is configured to isolate the sound source from the composite audio signal and modify the composite audio signal such that the sound source i is repositioned in the new spatial position in the audio image, as indicated in step 970.

In case the sound source i is not to be repositioned or once the repositioning of the sound source i has been carried out, the apparatus is configured to identify—e.g. on basis of the metadata associated with the composite audio signal or sound sources comprised in the composite audio signal or on basis of a command or indication received from a user interface of the apparatus—whether the sound source i is to be replaced with another sound source. In case an indication to replace the sound source i with a second sound source is identified, the apparatus is configured to isolate the sound source i from the composite audio signal, attenuate the respective audio signal components of the composite audio signal, and modify the composite audio signal by inserting the second sound source in the spatial position of the sound source i in the audio image, as indicated in step 980. The indication to replace the sound source i may further comprise indication of the second sound source.

In case the sound source i is not be replaced or once the replacement of the sound source i has been carried out, the apparatus may be configured to select the next sound source of the composite audio signal and continue to process from step 910, as indicated in step 990. The selection of the next sound source may comprise setting the identifier i to indicate the next sound source (e.g. i=i+1). Moreover, assuming that the composite audio signal comprises N sound source, the selection of the next sound source may further comprise selecting the first sound source in case the sound source i was the N:th sound source (e.g. if i>N then i=1).

The apparatus may be configured to carry out the process 900 until the playback of the composite audio signal is completed. The processing may involve processing the composite audio signal in temporal segments referred to as audio frames, in other words the apparatus may be configured to carry out one iteration round of the process 900 for each sound source of the composite audio signal (e.g. i=1, . . . , N) for each audio frame of the composite audio signal. An audio frame may have a duration e.g. in the range 10 to 100 ms.

The operations, procedures and/or functions assigned to the structural units of the apparatus 300, i.e. to the audio analyzer 310, to the user interface controller 320 and to the audio processor 330, may be divided between these units in a different manner. Moreover, the apparatus 300 may comprise further units that may be configured to perform some of the operations, procedures and/or functions assigned to the above-mentioned processing units.

On the other hand, the operations, procedures and/or functions assigned to the audio analyzer 310, to the user interface controller 320 and to the audio processor 330 may be assigned to a single processing unit within the apparatus 300 instead. In particular, the apparatus 300 may comprise means for obtaining information indicative of spatial positions of one or more sound sources within an audio image of a composite audio signal, means for obtaining information indicative of the types of the one or more sound sources, means for determining, for each of the one or more sound sources, a position in a display of the apparatus indicative of the spatial position of the sound source, means for causing an apparatus to display, for each of the one or more sound sources, an item representing the sound source in the respective determined position in the display, wherein the item representing the sound source is determined on basis of the type of the sound source, means for receiving an indication of a user action associated with an item indicative of a selected sound source, means for determining an indication of a user selected modification of the audio image on basis of the user action, and means for modifying the composite audio signal in accordance with the user selected modification.

Figure 10:
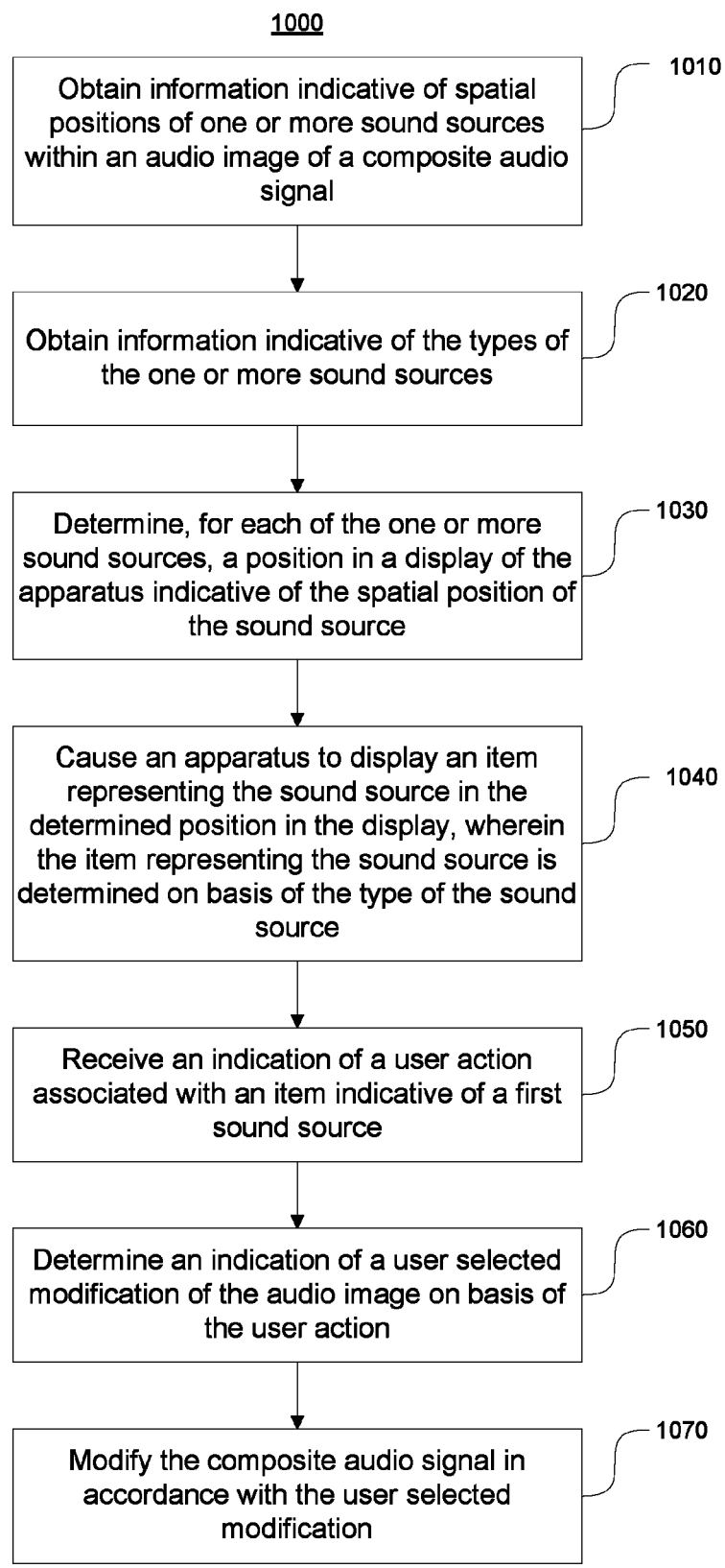
FIG. 10 illustrates a method in accordance with an embodiment of the invention.

The operations, procedures and/or functions described hereinbefore in context of the apparatus 300 may also be expressed as steps of a method implementing the corresponding operation, procedure and/or function. As an example, FIG. 10 illustrates a method 1000 in accordance with an embodiment of the invention. The method 1000 comprises obtaining information indicative of spatial positions of one or more sound sources within an audio image of a composite audio signal, as indicated in step 1010. The method 1000 further comprises obtaining information indicative of the types of the one or more sound sources, as indicated in step 1020. The method 1000 further comprises determining, for each of the one or more sound sources, a position in a display of the apparatus indicative of the spatial position of the sound source, as indicated in step 1030. The method 1000 further comprises causing an apparatus to display an item representing the sound source in the determined position in the display, wherein the item representing the sound source is determined on basis of the type of the sound source, as indicated in step 1040. The method 1000 further comprises receiving an indication of a user action associated with an item indicative of a first sound source, as indicated in step 1050. The method 1000 further comprises determining an indication of a user selected modification of the audio image on basis of the user action, as indicated in step 1060. The method 1000 further comprises modifying the composite audio signal in accordance with the user selected modification, as indicated in step 1070.

Figure 11:
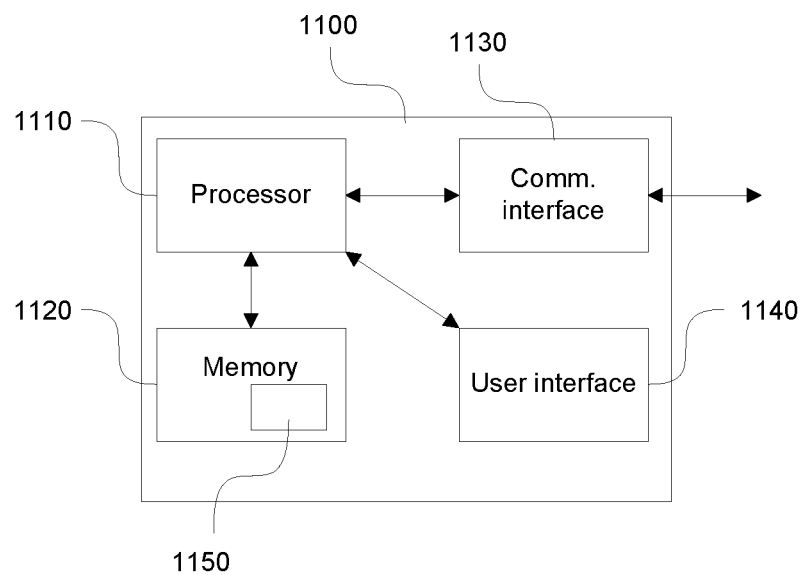
FIG. 11 schematically illustrates an apparatus in accordance with an embodiment of the invention.

FIG. 11 schematically illustrates an apparatus 1100 in accordance with an embodiment of the invention. The apparatus 1100 may be used as the audio processing apparatus 300 or the apparatus 1100 may comprise the audio processing apparatus 300. The apparatus 1100 may be an end-product or a module, the term module referring to a unit or an apparatus that excludes certain parts or components that may be introduced by an end-manufacturer or by a user to result in an apparatus forming an end-product.

The apparatus 1100 may be implemented as hardware alone (e.g. a circuit, a programmable or non-programmable processor, etc.), the apparatus 1100 may have certain aspects implemented as software (e.g. firmware) alone or can be implemented as a combination of hardware and software.

The apparatus 1100 may be implemented using instructions that enable hardware functionality, for example, by using executable computer program instructions in a general-purpose or special-purpose processor that may be stored on a computer readable storage medium (disk, memory etc) to be executed by such a processor.

In the example of FIG. 11 the apparatus 1100 comprises a processor 1110, a memory 1120 and a communication interface 1130, such as a network card or a network adapter enabling wireless or wireline communication with another apparatus. The processor 1110 is configured to read from and write to the memory 1120. The apparatus 1100 may further comprise a user interface 1140 for providing data, commands and/or other input to the processor 1110 and/or for receiving data or other output from the processor 1110, the user interface 1140 comprising for example one or more of a display, a keyboard or keys, a mouse or a respective pointing device, a touchscreen, etc. The apparatus 1100 may comprise further components not illustrated in the example of FIG. 11.

Although the processor 1110 is presented in the example of FIG. 11 as single component, the processor 1110 may be implemented as one or more separate components. Although the memory 1120 in the example of FIG. 11 is illustrated as a single component, the memory 1120 may be implemented as one or more separate components, some or all of which may be integrated/removable and/or may provide permanent/semi-permanent/dynamic/cached storage The apparatus 1100 may be embodied for example as a mobile phone, a camera, a video camera, a music player, a gaming device, a laptop computer, a desktop computer, a personal digital assistant (PDA), an internet tablet, a television set, etc.

The memory 1120 may store a computer program 1150 comprising computerexecutable instructions that control the operation of the apparatus 1100 when loaded into the processor 1110. As an example, the computer program 1150 may include one or more sequences of one or more instructions. The computer program 1150 may be provided as a computer program code. The processor 1110 is able to load and execute the computer program 1150 by reading the one or more sequences of one or more instructions included therein from the memory 1120. The one or more sequences of one or more instructions may be configured to, when executed by one or more processors, cause an apparatus, for example the apparatus 1100, to implement processing according to one or more embodiments of the invention described hereinbefore.

Hence, the apparatus 1100 may comprise at least one processor 1110 and at least one memory 1120 including computer program code for one or more programs, the at least one memory 1120 and the computer program code configured to, with the at least one processor 1110, cause the apparatus 1100 to perform processing in accordance with one or more embodiments of the invention described hereinbefore.

The computer program 1150 may be provided at the apparatus 1100 via any suitable delivery mechanism. As an example, the delivery mechanism may comprise at least one computer readable non-transitory medium having program code stored thereon, the program code which when executed by an apparatus cause the apparatus at least implement processing in accordance with an embodiment of the invention, such as the method 1000 described hereinbefore. The delivery mechanism may be for example a computer readable storage medium, a computer program product, a memory device a record medium such as a CD-ROM or DVD, an article of manufacture that tangibly embodies the computer program 1150. As a further example, the delivery mechanism may be a signal configured to reliably transfer the computer program 1150.

Reference to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A method comprising
   obtaining information indicative of spatial positions of one or more sound sources within an audio image of a composite audio signal,
   obtaining information indicative of the types of the one or more sound sources,
   determining, for each of the one or more sound sources, a position in a display of an apparatus indicative of the spatial position of the sound source and causing the apparatus to display an item representing the sound source in the determined position in the display, wherein the item representing the sound source is determined on basis of the type of the sound source
   receiving an indication of a user action associated with an item indicative of a first sound source, determining an indication of a user selected modification of the audio image on basis of the user action, and
   modifying the composite audio signal in accordance with the user selected modification.

2. The method according to claim 1, wherein obtaining information indicative of spatial positions of one or more sound sources within an audio image of a composite audio signal and obtaining information indicative of the types of the one or more sound sources comprise analyzing the audio signal content of the composite audio signal in one or more channels to obtain information indicative of spatial positions of the one or more sound sources and/or types thereof.

3. The method according to claim 2, wherein obtaining information indicative of spatial positions of one or more sound sources within an audio image of a composite audio signal and obtaining information indicative of the types of the one or more sound sources comprise
   extracting one or more audio signal components representing a given sound source from the composite audio signal,
   analyzing the one or more audio signal components to obtain information indicative of the spatial position of the given sound source, and
   analyzing the one or more audio signal components to obtain information indicative of the type of the given sound source.

4. The method according to claim 1, wherein obtaining information indicative of spatial positions of one or more sound sources within an audio image of a composite audio signal and obtaining information indicative of the types of the one or more sound sources comprise analyzing metadata associated with the composite audio signal to obtain information indicative of spatial positions of the one or more sound sources and/or types thereof.

5. The method according to claim 1, wherein said item representing a sound source comprises an image and/or text indicative of the type of the sound source.

6. The method according to claim 1, wherein the indication of the user action comprises an indication of the user pinching the item representing the selected sound source and the extent of pinching, and wherein the indication of the user selected modification comprises an indication to change the signal level of the selected sound source in accordance with the extent of pinching.

7. The method according to claim 1, wherein the indication of the user action comprises an indication of the user moving the item representing the selected sound source into a second position in the display, and wherein the indication of the user selected modification comprises an indication to change the spatial position of the selected sound source within the audio image to correspond the second position in the display.

8. The method according to claim 1, wherein the indication of the user action comprises an indication of the user selecting the item representing the selected sound source, wherein the user interface controller is further configured to cause the apparatus to display, in response to a user selecting the item, a number of options for modification of the selected sound source, and wherein the indication of the user selected modification comprises, in response to a user selecting one of the number of options, an indication of the user selected option.

9. The method according to claim 8, wherein the indication of the user selected modification further comprises a parameter associated with the user selected option.

10. The method according to claim 8, wherein the number of options comprise one or more of the following:
    replacement of the given sound source with a second sound source,
    change of the signal level of the given sound source,
    change of the spatial position of the given sound source, and
    cancellation of the given sound source.

11. An apparatus comprising at least one processor and at least one memory including computer program code for one or more programs, the at least one memory and the computer program code configured to, with the at least one processor, cause the apparatus to perform at least the following:
    obtain information indicative of spatial positions of one or more sound sources within an audio image of a composite audio signal,
    obtain information indicative of the types of the one or more sound sources;
    determine, for each of the one or more sound sources, a position in a display of the apparatus indicative of the spatial position of the sound source and cause the apparatus to display an item representing the sound source in the determined position in the display, wherein the item representing the sound source is determined on basis of the type of the sound source,
    receive an indication of a user action associated with an item representing a selected sound source, determine an indication of a user selected modification of the audio image on basis of the user action; and
    modify the composite audio signal in accordance with the user selected modification.

12. The apparatus according to claim 11, wherein obtaining information indicative of spatial positions of one or more sound sources within an audio image of a composite audio signal and obtaining information indicative of the types of the one or more sound sources comprise analyze the audio signal content of the composite audio signal in one or more channels to obtain information indicative of spatial positions of the one or more sound sources and/or types thereof.

13. The apparatus according to claim 12, wherein obtaining information indicative of spatial positions of one or more sound sources within an audio image of a composite audio signal and obtaining information indicative of the types of the one or more sound sources comprise
    extract one or more audio signal components representing a given sound source from the composite audio signal,
    analyze the one or more audio signal components to obtain information indicative of the spatial position of the given sound source, and
    analyze the one or more audio signal components to obtain information indicative of the type of the given sound source.

14. The apparatus according to claim 11, wherein obtaining information indicative of spatial positions of one or more sound sources within an audio image of a composite audio signal and obtaining information indicative of the types of the one or more sound sources comprise analyze metadata associated with the composite audio signal to obtain information indicative of spatial positions of the one or more sound sources and/or types thereof.

15. The apparatus according to claim 11, wherein said item representing a sound source comprises an image and/or text indicative of the type of the sound source.

16. The apparatus according to claim 11, wherein the indication of the user action comprises an indication of the user pinching the item representing the selected sound source and the extent of pinching, and wherein the indication of the user selected modification comprises an indication to change the signal level of the selected sound source in accordance with the extent of pinching.

17. The apparatus according to claim 11, wherein the indication of the user action comprises an indication of the user moving the item representing the selected sound source into a second position in the display, and wherein the indication of the user selected modification comprises an indication to change the spatial position of the selected sound source within the audio image to correspond the second position in the display.

18. The apparatus according to claim 11, wherein the indication of the user action comprises an indication of the user selecting the item representing the selected sound source, wherein the user interface controller is further configured to cause the apparatus to display, in response to a user selecting the item, a number of options for modification of the selected sound source, and wherein the indication of the user selected modification comprises, in response to a user selecting one of the number of options, an indication of the user selected option.

19. The apparatus according to claim 18, wherein the number of options comprise one or more of the following:
    replacement of the given sound source with a second sound source,
    change of the signal level of the given sound source,
    change of the spatial position of the given sound source, and
    cancellation of the given sound source.

20. A computer program product comprising at least one computer readable non-transitory medium having program code stored thereon, the program code which when executed by an apparatus cause the apparatus at least to perform:
    obtain information indicative of spatial positions of one or more sound sources within an audio image of a composite audio signal,
    obtain information indicative of the types of the one or more sound sources;
    determine, for each of the one or more sound sources, a position in a display of the apparatus indicative of the spatial position of the sound source and cause the apparatus to display an item representing the sound source in the determined position in the display, wherein the item representing the sound source is determined on basis of the type of the sound source, receive an indication of a user action associated with an item representing a selected sound source, determine an indication of a user selected modification of the audio image on basis of the user action; and modify the composite audio signal in accordance with the user selected modification.

* * * * *